(12) United States Patent
Allan

(10) Patent No.: US 8,097,151 B2
(45) Date of Patent: Jan. 17, 2012

(54) WATER HARVESTING DEVICE

(75) Inventor: Scott William Allan, Kitchener (CA)

(73) Assignee: Green Ripple Innovations Inc., Waterloo (CA)

( * ) Notice: Subject to any disclaimer, the term of this patent is extended or adjusted under 35 U.S.C. 154(b) by 21 days.

(21) Appl. No.: 12/540,033

(22) Filed: Aug. 12, 2009

(65) Prior Publication Data
US 2010/0038300 A1 Feb. 18, 2010

Related U.S. Application Data

(60) Provisional application No. 61/096,237, filed on Sep. 11, 2008, provisional application No. 61/088,367, filed on Aug. 13, 2008.

(51) Int. Cl.
*B01D 35/027* (2006.01)

(52) U.S. Cl. ............... 210/162; 210/170.03; 210/433.1; 210/475; 52/12; 52/16; 220/601; 137/357

(58) Field of Classification Search .......... 210/154, 210/162, 170.03, 433.1, 474, 475, 489; 52/12, 52/16; 137/357; 220/565, 601
See application file for complete search history.

(56) References Cited

U.S. PATENT DOCUMENTS

| | | | | |
|---|---|---|---|---|
| 1,062,650 A * | 5/1913 | Hudson | | 210/475 |
| 5,406,966 A * | 4/1995 | Lepkowski et al. | | 210/162 |
| 5,526,612 A * | 6/1996 | Wade | | 52/12 |
| 5,730,179 A * | 3/1998 | Taylor | | 52/16 |
| 6,619,312 B2 * | 9/2003 | Doiron | | 52/16 |
| 6,941,702 B1 * | 9/2005 | Abrams et al. | | 52/16 |
| 6,988,640 B2 * | 1/2006 | Backe | | 220/601 |
| 7,300,590 B2 * | 11/2007 | Weir et al. | | 210/170.03 |
| 2005/0247611 A1 * | 11/2005 | Groth et al. | | 210/162 |
| 2008/0086953 A1 * | 4/2008 | Graf | | 52/12 |
| 2009/0065072 A1 * | 3/2009 | Adamson | | 137/357 |
| 2010/0096390 A1 * | 4/2010 | Allan | | 220/565 |

OTHER PUBLICATIONS

River Sale Rain Barrel Corporate Sales and Installation Brochure by RIVERSIDES, Copyright 2003, published on-line by www.riversides.org 3 pages total.

* cited by examiner

*Primary Examiner* — Christopher Upton
(74) *Attorney, Agent, or Firm* — Borden Ladner Gervais LLP; Jeffrey W. Wong

(57) ABSTRACT

The device disclosed is an improved water harvesting device providing the capability of diverting debris away from a water entry area and reducing potential for clogging of the water entry area. The water harvesting device comprises a tank portion for containment of water and a water entry portion for receiving water, particularly rainwater from a building water collection system such as an eaves and downspout configuration. Debris typically accompanying rainwater as it exits from the downspout of the building collection system is diverted away from the water entry area allowing for better water collection efficiency, preventing backing of water and reducing operator maintenance of the device.

13 Claims, 5 Drawing Sheets

WATER HARVESTING DEVICE

CROSS REFERENCE TO RELATED APPLICATIONS

This application claims the benefit of U.S. Provisional Application No. 61/088,367 filed Aug. 13, 2008 and U.S. Provisional Application No. 61/096,237 filed Sep. 11, 2008 which is incorporated herein by reference.

FIELD OF THE INVENTION

The present invention relates generally to devices for capturing and storing water such as the devices used in harvesting rainwater commonly referred to also as rain barrels. More particularly, the present invention relates to such a device for use above ground, aside the exterior wall of small buildings predominantly used in conjunction with common rainwater collection systems such as those found on residential dwellings and small commercial structures.

BACKGROUND OF THE INVENTION

It can be appreciated that water harvesting devices have been around for years. The purpose of these devices is quite simple, that is to capture water and store it for later use. One common example as such is the commonly known rain barrel. The water harvesting device in this case captures water that is collected from water collection systems like an eaves and downspout system affixed onto a building structure. Once the water is captured it is stored within and kept for later use such as drier days when rainwater is not available. While these devices have not changed much in past years, public use and concerns surrounding safety, improved performance and convenience has risen in recent decades due to their increased yet recent popularity for water conservation demand. Current devices in the present art are not adequately meeting the rising needs of the public.

One major concern of these devices is to provide adequate means for collecting water most efficiently while also ensuring that foreign matter or debris is not collected with it or that may cause an obstruction to water flow. In the example of rainwater harvesting from a building collection systems, debris such as twigs, leaves from trees and other matter often accompany rain water exiting from conventional eaves and downspouts and without adequate management of these items water inlet areas can fill and clog with debris resulting in ineffective water collection or even backing up of the water toward the building structure. There are prior art devices for rainwater collection, filters and the like for installation within the eaves and downspouts but failing to install these or properly maintaining them raises the needs to have these safeguards directly integrated with the water harvesting device. Furthermore, many prior art devices that capture such debris requires frequent and regular maintenance is required to keep the inlet are clean resulting in time consuming maintenance for the user. These debris items, twigs for example are often shaped such that they can also enter the water inlet and potentially cause damage to internal components of a water harvesting device. In the example of a rainwater harvesting device, filtering devices or mosquito safety screens installed at the inlet are susceptible to damage from entering debris. Once a tear or hole is pierced in the safety netting mosquitoes are free to enter the device and lay their eggs, potentially leading to the undesired breeding of the West Nile Virus.

Another concern with these devices is that adequate means water and debris management all year around is not provided. During each season, water and debris should be managed so each may be directed in a proper manner so as to: avoid collection of water into the tank potentially freezing and causing damage to the device; and avoid clogging of flow and potential backing up of water-flow due to debris build-up. Current rainwater harvesting devices do not facilitate management of this debris as such.

Furthermore, concerns regarding: easy installation; simple, worry-free maintenance; and simple and intuitive mechanisms for flow diversion are all desired elements of a water harvesting device which are not addressed with the prior art. Adequate means for the above should be provided by integrating the same directly within or onto the water device to also avoid the complex piping needs of remotely installed diverters or filters. Should a device provide this, installation would be simplified and cost of commissioning such a device would reduce.

Accordingly, it would be advantageous to have a water harvesting device that provides improved collection, diversion means, reduced user maintenance, simplified installation or provides a safer operating device.

SUMMARY OF THE INVENTION

In view of the above it is an object of the present invention to obviate or mitigate at least one disadvantage in the prior art, the present invention provides a debris diversion enabled water harvesting device.

Thus in the invention, the improved water harvesting device provides the ability to: efficiently collect water while diverting away unwanted debris; do so in all seasons of the year; simplify the installation and maintenance of the device or safeguard the property dwellers and building from harms associated with water collection and storage.

To attain this, the present invention generally comprises a water storage receptacle with improved water collection at the area of water entry. Capability for diversion of debris is provided at the water entry area for keeping the entry area clear for subsequent water flow.

During colder months when water collection is not desired the device provides the means necessary to divert both water and debris from the water entry area so water collection can be prevented. A user activated water by-pass is put in place on the device to accomplish this.

Once the flow is away from the water entry area, further means is provided in the present invention to continue the diversion of water, debris or both off of the water harvesting device further adding to the its diversion capability. A significantly larger flow area with much less obstruction or flow restriction is provided. A larger, free flow results in less clogging even with situations such as those with the larger, broader type debris such as leaves fallen from the tree finding their way into the downspout flow. Such means as will be described in more detail below simplifies and significantly reduces the maintenance necessary for continued operation of the device. Direct integration of diversion means onto or within the water harvesting device avoids from having to install auxiliary diversion devices, auxiliary devices typically increase maintenance and complexity of installation.

Means are also provided in the present invention to increase protection of filtering or screening devices from damage-causing debris travelling out of the downspout exit. Physical guards are strategically placed to reduce or prevent contact of debris to the screen, to baffle its speed of entry or divert it away to an area that does not cause harm. Such safeguards increase the life of the screen and its ability to protect the property owners, device users and surrounding public particularly with the use in rainwater harvesting devices and protection against the spread of West Nile Virus.

A significantly larger area for water entry on the device is also disclosed in the present invention. A device with a lengthy water entry area coincidental to the building wall avoids the need for exact placement of the device therefore reducing installation time and complexity. Diversion and protection means such as those that will be described in more detail below may also be incorporated across a large entry area.

There has thus been outlined, rather broadly, the various features on the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarding as limiting.

A primary object of the present invention is to provide an improved water harvesting device that will overcome at least one of the shortcomings of the prior art devices.

An object of the invention to provide a device that diverts debris away from an area of water entry to maintain capacity for water collection and reduce user maintenance.

Another object of the invention is to provide enhanced protection and reduce susceptibility of damage to filtering or screening device such as mosquito entry-prevention screens used in rainwater harvesting devices.

Another object of the present invention to provide a simple water bypass for colder, non-collecting months so maintenance can be further reduced and installation can be further simplified.

Another object of the invention is to provide enhanced movement of diverted flow to better facilitate removal of flow off of the device, in the various operating positions for further elimination of clogs and reduction in maintenance.

Yet another object of the invention is to provide a much simpler, quicker, less placement accuracy dependant method of installation for the water harvesting device.

To the accomplishment of the above and related objects, this invention may be embodied in the form of illustrated in the accompanying drawings, attention being called to the fact, however, that the drawings are illustrative only, and that changes may be made in the specific construction illustrated.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Turning now descriptively to the drawings, in which a preferred embodiment is shown in the various configurations to describe the invention. It will be understood that while the invention is described with respect to a preferred embodiment the device may be configured differently while achieving the essence of the invention.

Figure 1:
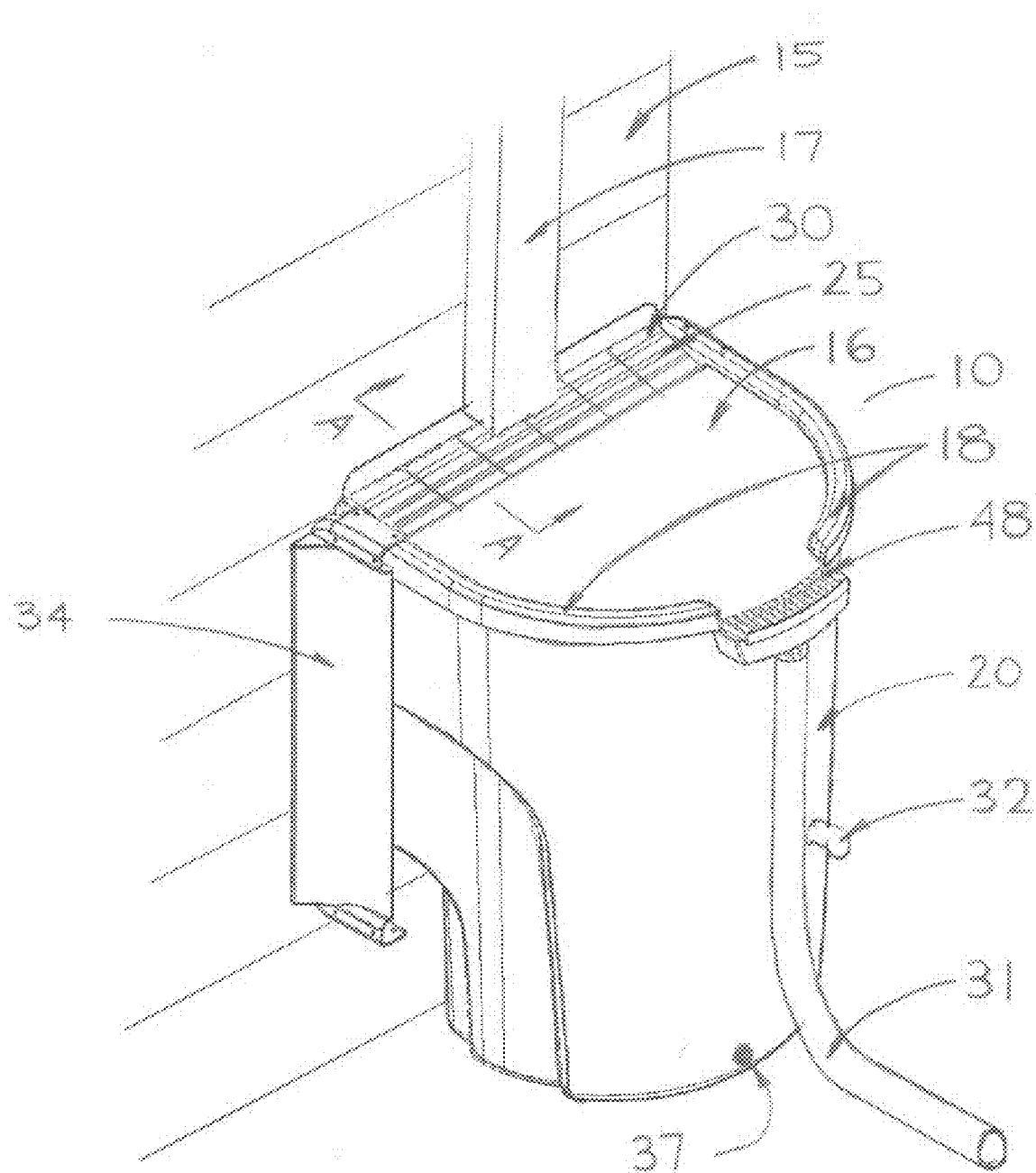
FIG. 1 illustrates perspective first embodiment of the present invention in a first position.

FIG. 1 illustrates a preferred embodiment, a rain water harvesting device 10 in an installed position. The rainwater harvesting device 10 is shown adjacent to a wall 15 of a residential building. The wall 15 is shown with a downspout 17 attached to it and represents one typical configuration prepared for use with a rainwater harvest device. Rainwater that is collected from building structures are collected using eaves (not shown), the water then enters into the downspout 17. The downspout 17 is positioned above the rainwater harvest device 10 such that the water exiting the downspout 17 spills onto the rainwater harvest device 10. For basic operation the rainwater harvesting device 10 comprises a tank portion 20 and a water entry area 25, the rainwater that exits the downspout 17 travels through the water entry area 25 and into the tank portion 20 for later use. Rainwater harvesting devices predominantly come in one or two piece tank systems, the preferred embodiment is shown as a two piece system a tank portion 20 and a lid portion 16. The present invention may apply to tank systems constructed of one piece, two piece or multiple pieces. Other items common to the rainwater harvesting devices as known to one skilled in the art includes a screen (not shown) for preventing entry of mosquitoes and other unwanted items, draining devices; faucet 32 and drain 37 as well as an overflow device, the overflow channel 31 shown attached to an overflow device. FIG. 1 illustrates the water harvesting device ready for collection of rainwater. The preferred embodiment of the present invention also includes a first diversion apparatus 30, a water by-pass 34, abutments 18 and a second diversion apparatus 48 all of which will be better described in the specification below.

Figure 2:
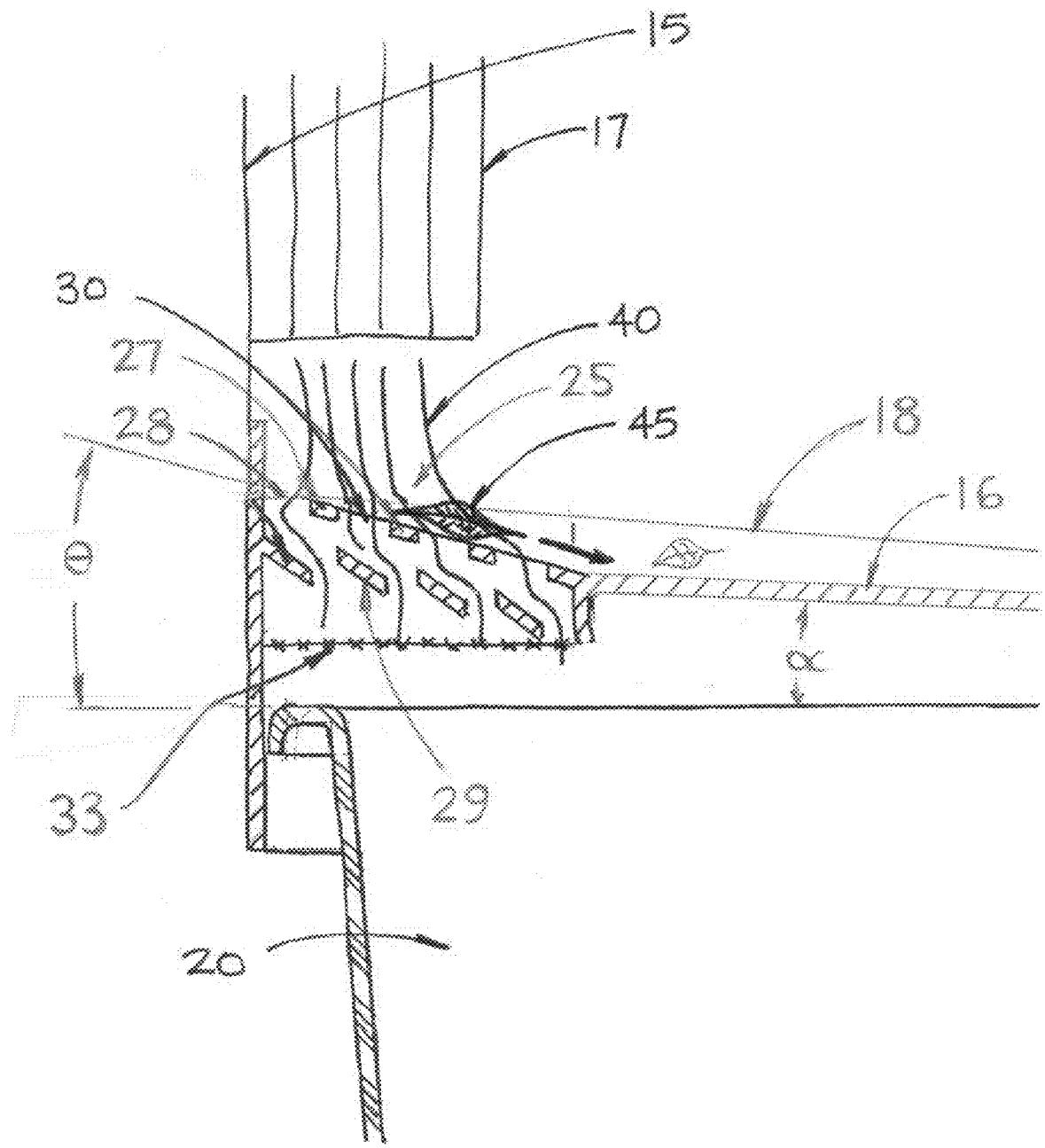
FIG. 2 illustrates a partial section first side view of a first embodiment of the present invention.

FIG. 2 is a cut away view, taken along line A-A of FIG. 1 which illustrates the water entry area 25 and its operation in collection position, ready for the collection of rainwater. Rainwater 40 and the debris 45 that typically accompanies it, exits the downspout 17 into the water entry area 25. The water entry area 25 comprises first diversion apparatus 30 for diverting the debris away from the water entry area 25. The first diversion apparatus 30 in the preferred embodiment is constructed with a strategically placed louvered surface including uppermost components 27, openings 28 and lower baffles 29. The uppermost components 27 coming in first contact with debris 25 and having an angled slope as indicated by Greek symbol Theta, guide the debris 45 aside in the direction as indicated by arrow 1 however, the uppermost surface also has sufficient openings 28 to accept the rainwater 40 through the water entry area 25 and into the tank portion 20. The debris 45 having been guided aside and away from the water entry area 25, is no longer in a position that hinders collection of the rain water thereby improving the collection efficiency and reducing clogging of the rainwater harvesting device 10. The debris 45 will then, over time be washed away during rainfalls down the gradual slope of lid 16 indicated by the Greek symbol of Alpha. As well the first diversion apparatus 30 also protects the first screen 33 from debris 45. In the preferred embodiment, as the debris 45 falls out of downspout 17, the uppermost components 27 provide protection for the first screen 33. For additional protection a lower baffles 29 is also be provided, lower baffles 29 illustrated on an angle also facilitates directed entry of rainwater 40. The horizontal positioning of the uppermost components 27 respective lower baffles 29 provides sufficient covering or protection so that the first screen 33 is protected from vertically positioned falling items such as twigs. The protection means of the first diversion apparatus 30 therefore prevents premature tearing or damage and extending the life of the rainwater harvesting device. This provides added protection of the device to prevent spreading of the West Nile Virus caused by the reproduction of mosquito larvae of infected mosquitoes. In the case of the preferred embodiment, the louvered construction is only one example of how first diversion apparatus 30 may be configured to collect rainwater 40, divert debris 45 and protect the first screen 33 from continuous contact from the same. Factors such as: what degree of protection is require to adequately protect the screen; what water collection efficiency is desired among many other factors play a role in determining the final construction and it should be understood by one who is skilled in the art that other configurations are made possible within the present invention.

Figure 3:
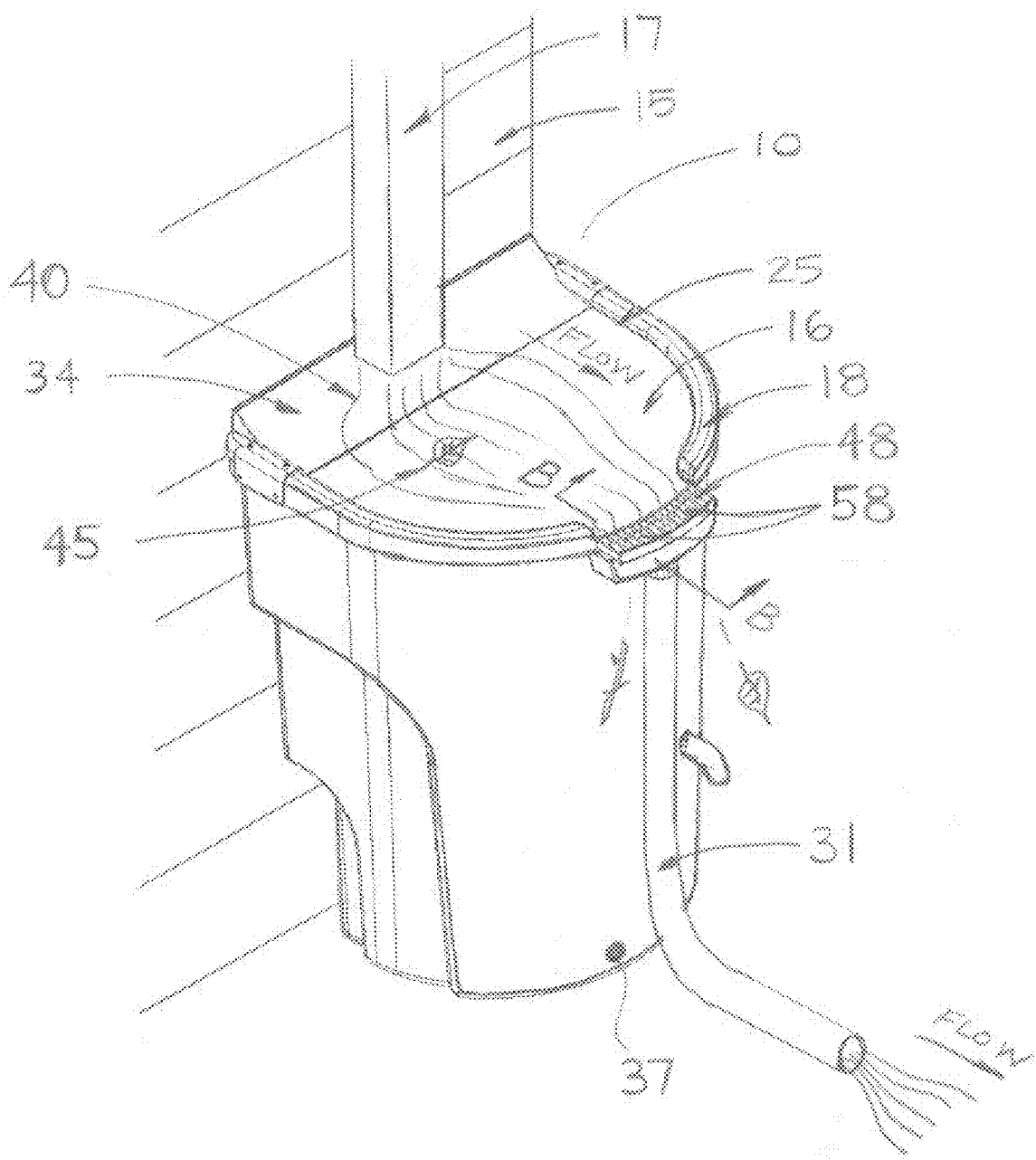
FIG. 3 illustrates a perspective first embodiment of the present invention in a second position.

FIG. 3 illustrates the preferred embodiment in the position for water by-pass. In this position, rainwater 40 is diverted away from entering the tank as by-pass 34 is installed to cover the water entry area 25 (not shown). Water by-pass position is used when the user does not want to collect water into the tank portion 20 and for the preferred embodiment is predominantly used during colder months of the year when the water inside is susceptible to freezing. Any water left in the tank expands in colder temperatures and may cause irreparable damage to the tank portion 20 if the water becomes frozen so in order to prevent this situation by-pass 34 is placed into by-pass position avoid additional water from entering the tank portion 20. Any water remaining in the tank is drained through drain 37 and the tank portion 20 remains empty during this period, therefore eliminating potential damage to the tank portion 20. This method is particularly useful for rainwater harvesting devices because it avoids the user from having to remove the rainwater harvesting device 10 from the wall during colder climates. Furthermore, the user no longer needs to install temporary downspouts in lieu of the removed tank to direct the water away from the building and its foundation. Once the warmer climate returns, the drain 37 is closed to retain water, the by-pass 34 is removed and the rainwater harvesting device 10 returns to the collection position and is in operation for collecting again. FIG. 3 also illustrates the flow of water and debris with the present invention. Rainwater 40 and debris 45 exiting out from the downspout 17 flows across the by-pass 34, across the lid 16 into the area of the second diversion apparatus 48. The abutments 18 assist in containing and directing the flow in the preferred direction toward the second diversion apparatus 48. As one skilled in the art knows, there may be various alternative designs for abutments 18 that would serve similar purposes as those described and would remain in the scope of the present invention. As can also be seen in FIG. 3, the construction within the second diversion apparatus 48 is not of louvered construction but rather a series of strategically spaced vertical walls 58 adjoined at the perimeter of lid 16 and between abutments 18. This method is adequate to divert debris, protect screen devices, capture water and can also be utilized in the area of the first diversion apparatus 30 if so desired. This demonstrates the multiple means in which diversion is made possible within the scope of the invention as will be better described in the specification below.

Figure 4:
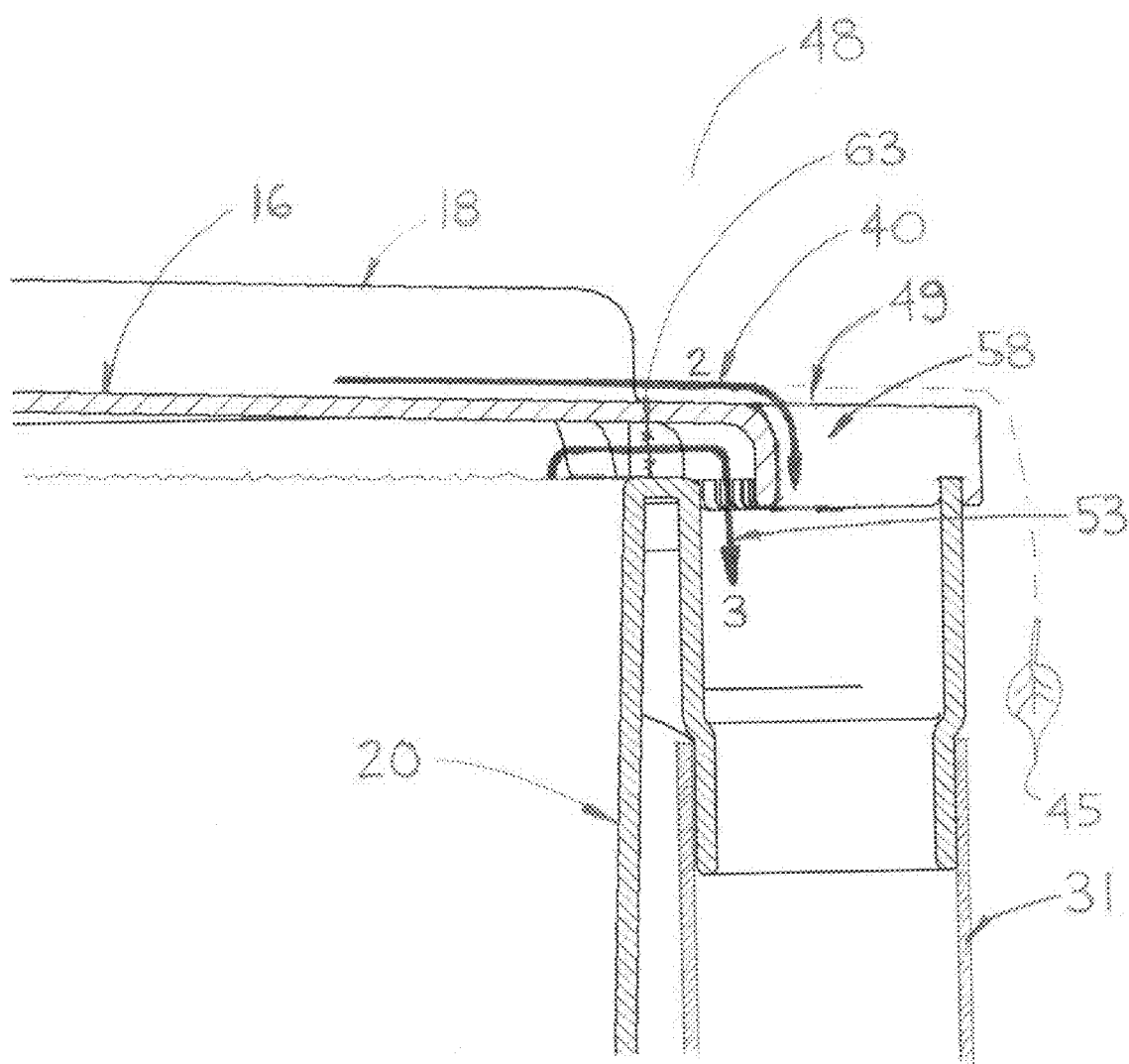
FIG. 4 illustrates a partial section second side view of a first embodiment of the present invention.

FIG. 4 is a cut away view, taken along line B-B of FIG. 3 which illustrates the operation of the device once the rainwater 40, debris 45 or both work its way across the lid 16 and into the area of the second diversion apparatus 48. As previously mentioned, the second diversion apparatus 48 is alternatively constructed with a series of vertical walls 58. The space between the vertical walls 58 permits the rainwater 40 to fall downward through the water entry area 49 and into the overflow channel 31 as indicated by arrow 2 and the top of the vertical wall 58 enables diversion of the debris 45 off the device. The vertical wall 58 is not shown with a downward slope but for improved diversion performance in this location it could simply be provided with one. This diversion again provides the ability for the debris 45 to be diverted away from an area that may cause the clogging water flow. During the full travel of the debris from the time it engages the rainwater harvesting device 10 to the time it departs, there exists no fully enclosed portion to cause a full restriction during convergence. This is unlike a pipe configuration such as in the prior art whereas a pipe has a fully enclosed diametrical portion causing enclosed restriction during convergence, meaning there is no place for the debris to escape and clogging is likely. As can also be seen in FIG. 4, the overflowing water 53 from tank portion 20 also enters into overflow channel 31 as indicated by arrow 3, therefore since the vertical walls 58 of second diversion apparatus 48 reduces debris 45 from entering the overflow channel 31, clogging of the device and potential backing up of water is reduced. The second diversion apparatus 48 also protects a second screen 63 from damage, again enabling an extended life of the same. The screens 33 (not shown) and 63 can now provide a device fully sealed from mosquito entry and the diversion apparatuses 30 (not shown) and 48 protecting them from damage keeping the device secure.

Figure 5A:
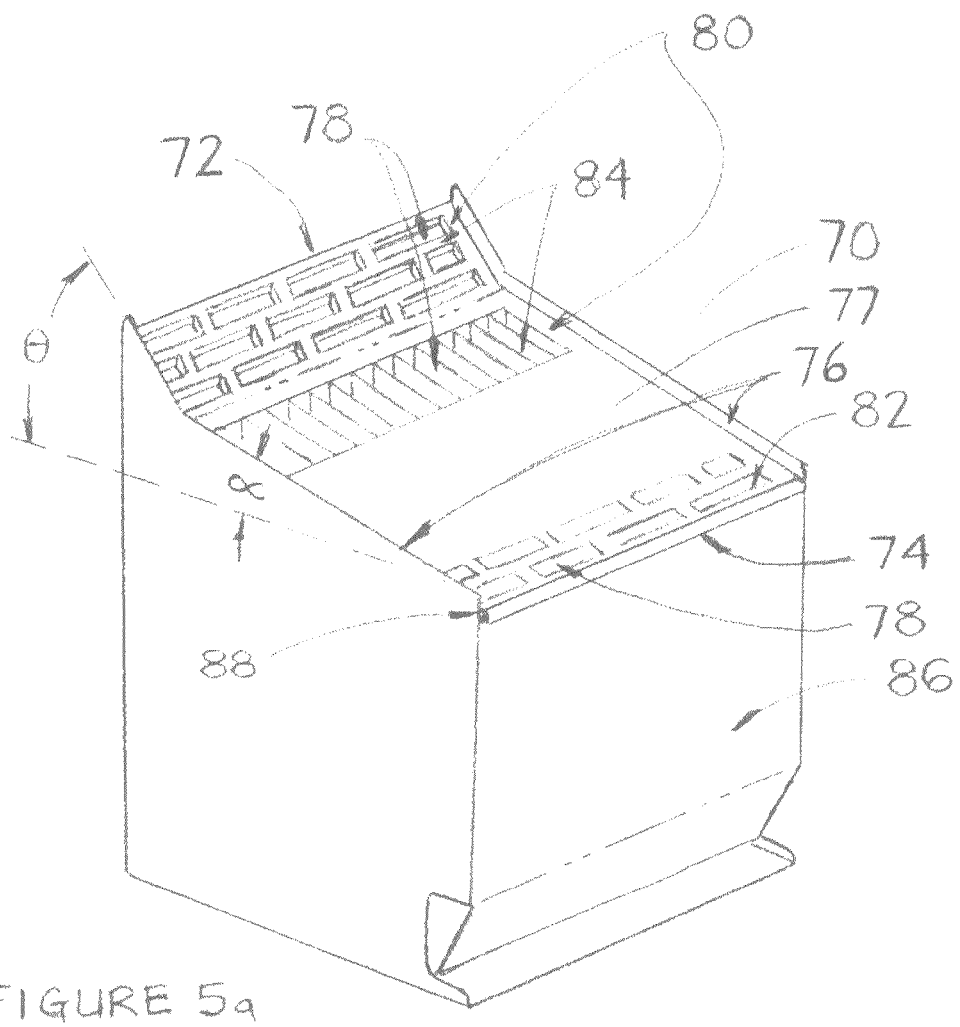
FIGS. 5a and 5b illustrate an alternate embodiment of the present invention.
Figure 5B:
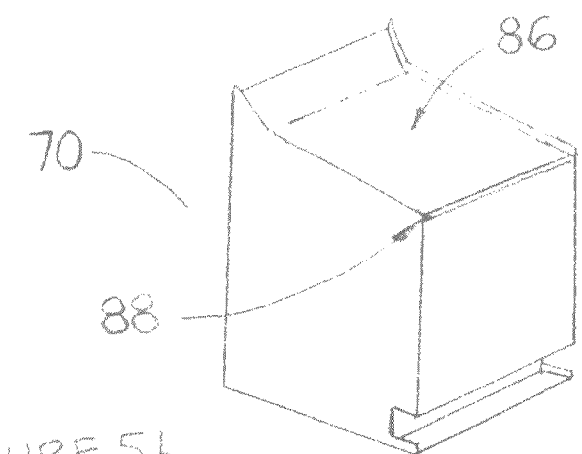

FIG. 5 is an alternative embodiment of the present invention. As understood by the previous description, the diverted flow is being facilitated by the water harvesting unit itself and components thereon as opposed to pipes and constricting orifices therein that the device may be connected to. Accordingly, the water harvesting device can also to facilitate a significantly higher diversion flow potential merely by altering its size and shape essentially minimizing potential for clogging of flow. This is demonstrated in the alternative embodiment illustrated in FIG. 5. Here, the water harvesting device 70 is rectangularly shaped, the length of the device at the rear edge 72 equals that of the front edge 74; Theta and Alpha angles are increased in slope for downward diversion; and the abutments 76 are parallel on the sides perpendicular to rear edge 72, front edge 74. This facilitates and significantly increases diversion volume and capability. The obstructions are minimal being only the apertures 78 in the lid 77 which are configured for maximum water capture and minimized obstruction within the water entry area 80 and the second diversion apparatus 82. During the full travel of the debris from the time it engages the water harvesting device 70 to the time it departs, there exists no fully enclosed portion to cause a full restriction or any convergence. This is unlike a pipe configuration such as in the prior art whereas a pipe has a fully enclosed diametrical portion causing enclosed restriction during convergence, meaning there is no place for the debris to escape and clogging is likely. Furthermore, diversion apparatus 84 and second diversion apparatus 82 still protect the filtering or screening device (not shown). For by-pass position by-pass 86 is rotated in position to cover the lid 77 with hinge 88. The bypass position is more clearly illustrated in FIG. 5*b*.

With respect to the above description then, it is realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A debris diversion enabled water harvesting device comprising;
   a tank portion for containment of water and at least one water entry area for the entry of water into said tank portion;
   wherein said water entry area includes a diversion apparatus for diverting unwanted debris away from said water entry area;
   a water overflow located in the upper area of said tank portion wherein said water overflow may release excess water from within the said tank portion;
   wherein said water overflow includes a screen.

2. The device of claim 1 further comprising a second screen at said water entry area to prevent entry of items that are not desired in said tank portion.

3. The device of claim 2 wherein said diversion apparatus provides protection for said second screen.

4. The device of claim 1 further comprising a bypass for diverting water away from the water entry area and preventing entry into said tank portion.

5. The device of claim 4 wherein said bypass is user activated.

6. The device of claim 1 wherein the device is configured such that when installed against a wall said water entry area when in installed position is close in proximity to the wall at which the device is installed against.

7. The device of claim 6 wherein the water entry area is lengthened in a direction substantially parallel to said wall.

8. The device of claim 7 further comprising a bypass for diverting water away from the water entry area and preventing entry into said tank portion.

9. The device of claim 1 further comprising means for continuing diversion of any diverted substances off the device.

10. The device of claim 9 wherein the said means for continuing diversion is sloped downward to allow for said substances to be divert in a predetermined direction.

11. The device of claim 1 wherein the said water overflow comprises a second diversion apparatus for diverting debris from the tank portion.

12. The device of claim 11 wherein said second diversion apparatus while diverting debris, also protects said screen.

13. A device of claim 1 wherein the route of debris diversion at no time contains an enclosed portion.

* * * * *